United States Patent
Keller et al.

[11] Patent Number: 5,891,593
[45] Date of Patent: Apr. 6, 1999

[54] ELECTRODE MATERIALS SUITABLE FOR LITHIUM-ION ELECTROCHEMICAL CELLS

[75] Inventors: Harald Keller, Ludwigshafen; Bernd Bronstert, Otterstadt; Helmut Steininger, Worms; Günter Heil; Rainer Blum, both of Ludwigshafen, all of Germany

[73] Assignee: EMTEC Magnetics GmbH, Ludwigshafen, Germany

[21] Appl. No.: 735,109

[22] Filed: Oct. 22, 1996

[30] Foreign Application Priority Data

Oct. 31, 1995 [DE] Germany .................. 195 40 556.0

[51] Int. Cl.⁶ .................. H01M 4/62; H01M 4/48
[52] U.S. Cl. .................. 429/217; 429/218
[58] Field of Search .................. 429/217, 218

[56] References Cited

U.S. PATENT DOCUMENTS

| | | | |
|---|---|---|---|
| 3,306,781 | 2/1967 | Siller | 429/217 |
| 3,317,347 | 5/1967 | Coleman et al. | 429/217 |
| 3,400,020 | 9/1968 | Carpino et al. | 429/217 |
| 3,565,694 | 2/1971 | Chireau | 429/217 X |
| 4,160,747 | 7/1979 | Schneider et al. | 429/217 X |
| 5,296,318 | 3/1994 | Gozdz et al. | 429/192 |
| 5,436,093 | 7/1995 | Huang et al. | 429/217 |
| 5,443,601 | 8/1995 | Doeff et al. | 29/623.5 |
| 5,514,492 | 5/1996 | Marincic et al. | 429/194 |
| 5,620,811 | 4/1997 | Zhang et al. | 429/217 X |
| 5,631,100 | 5/1997 | Yoshino et al. | 429/217 X |

FOREIGN PATENT DOCUMENTS

| | | |
|---|---|---|
| 528 557 | 2/1993 | European Pat. Off. . |
| 559 317 | 9/1993 | European Pat. Off. . |
| 43 28 785 | 8/1993 | Germany . |

OTHER PUBLICATIONS

*Ullmann's Encyclopedia*, vol. A3, pp. 343–397. (no date).

Primary Examiner—John S. Maples
Attorney, Agent, or Firm—Keil & Weinkauf

[57] ABSTRACT

Electrode materials suitable for electrochemical cells containing a) a polymeric binder which is composed essentially of polyisobutene having a limiting viscosity number of from 551 to 661 $g/cm^3$ and b) a solid which is capable of reversibly taking up or releasing lithium ions in an electrochemical reaction.

5 Claims, No Drawings

ELECTRODE MATERIALS SUITABLE FOR LITHIUM-ION ELECTROCHEMICAL CELLS

The present invention relates to electrode materials I suitable for electrochemical cells and containing
- a) a polymeric binder II which is composed essentially of fluorine-free monomers and
- b) a solid III which is capable of reversibly taking up or releasing lithium ions in an electrochemical reaction.

The present invention furthermore relates to electrode materials I which additionally contain polyethers, the use of the electrode materials I in electrodes and electrochemical cells, a process for the production of the electrodes, electrodes and electrochemical cells which contain an electrode material I, and electrochemical cells having such electrodes.

Electrochemical, in particular rechargeable, cells are generally known, for example from Ullmann's Encyclopedia of Industrial Chemistry, 5th Ed., Vol. A3, VCH Verlagsgesellschaft GmbH, Weinheim, 1985, pages 343–397.

Among these cells, the lithium batteries are particularly important, especially as secondary cells, owing to their high specific energy storage density.

As is generally known, for example, from DE-A 4328785, such cells contain in the cathode, as a compound capable of undergoing an electrochemical reaction, mixed oxides containing lithium ions and manganese, cobalt or nickel ions, such as those which, in the stoichiometrically simplest case, may be described as $LiMn_2O_4$, $LiCoO_2$ or $LiNiO_2$.

These mixed oxides undergo a reversal reaction with compounds capable of incorporating the lithium ions in their lattice, such as graphite, with removal of the small lithium ions from the crystal lattice, the metal ions, such as manganese, cobalt or nickel ions, being oxidized in said crystal lattice. This reaction can be utilized in an electrochemical cell for energy storage by separating the compound receiving the lithium ions, ie. the anode material, and the mixed oxide by electrolyte through which the lithium ions migrate from the mixed oxide to the anode material.

For charging the cell, electrons flow through an external voltage source and lithium cations through the electrolyte to the graphite. When the cell is used, the lithium cations flow through the electrolyte but the electrons flow through a useful resistance from the graphite to the mixed oxide.

The electrodes of the electrochemical cells consist of a substrate, generally a metal, and a binder layer which is applied thereon and contains the finely divided anode material, generally graphite, or the mixed oxide as finely divided cathode material. For coating the substrate, a suspension of the electrode materials and a solution of the binder are applied to the substrate, after which the solvent is evaporated off.

Highly resistant polymers have been proposed to date (U.S. Pat No. 5,296,318) as binders, for example a copolymer of vinylidene difluoride and hexafluoropropene.

However, such polymers are not only expensive but are also difficult to dissolve. Furthermore, they considerably increase the resistance of the cell so that the electrolyte, which usually consists of a lithium-containing conductive salt, such as $LiPF_6$, $LiAsF_6$ or $LiSbF_6$, and an organic solvent, such as ethylene carbonate or propylene carbonate, has to be added during the preparation of the electrode material (cf. U.S. Pat. No. cit.).

Since the conductive salts are known to be very sensitive to hydrolysis, and the hydrolysis leads not only to decomposition of the conductive salts but also to destruction of the electrochemically reactive compound by the hydrolysis products, this measure complicates both the preparation and the storage of the electrode material.

In order to increase the stability during storage, it is possible for the alternatively added electrolyte to be removed in an expensive process step after the coating required for the production of the electrode.

It is an object of the present invention to remedy the stated disadvantages.

We have found that this object is achieved by the electrode materials defined at the outset.

According to the invention, the polymeric binders II are composed essentially of fluorine-free monomers.

Suitable polymers II can be prepared in a manner known per se by various processes, for example by condensation reactions or by addition reactions.

The condensation reaction is understood as meaning the preparation of a polymer by reaction of monomers with elimination of low molecular weight substances.

In this way, it is possible to prepare polymers having a very wide range of functional groups, such as ester groups, for example in polyethylene terephthalate by reacting dimethyl terephthalate with ethylene glycol with elimination of methanol, or in poly(4,4'-isopropylidenediphenyl carbonate) by reacting 2,2-bis(p-hydroxyphenyl)propane (bisphenol A) with carbonic esters, such as dimethyl carbonate, with elimination of methanol, or with phosgene with elimination of hydrogen chloride, such as amido functions, for example in polyamide 66 by reacting hexamethylenediamine with adipic acid with elimination of water, or such as ether functions, for example in polyaryl ether ketones (PEK) from p-phenoxybenzoyl chloride with elimination of hydrogen chloride.

Addition reactions are known to be carried out as chain reactions or as step reactions.

Heterocycles whose ring is opened adjacent to the hetero atom in the reaction are particularly suitable for such chain reactions.

It is possible to incorporate various functional groups, such as ester groups, for example in polyester 6 by polymerization of ε-caprolactone, such as amido groups by polymerization of ε-caprolactam, such as amino groups, for example in polyethyleneimine by polymerization of ethyleneimine, or such as the ether groups particularly suitable for the polymeric binder II, for example in poly(propylene oxide), poly(butylene oxide), poly(styrene oxide), poly(tetrahydrofuran) and in particular poly(ethylene oxide).

Polyethers of various monomers and mixtures of such polyethers may also be used.

The number average molecular weight of polyethers should preferably be from 100,000 to 4 million, in particular 1 million to 2 million.

Such polyethers can be prepared in a manner known per se from the corresponding monomers and, if required, can be modified, but not substantially changed, in their mechanical, thermal and chemical properties by an addition reaction with amines, alcohols and acids at the chain ends.

Polymeric binders II synthesized by chain reaction essentially from an ester of an α,β-unsaturated carboxylic acid and a $C_1$–$C_{15}$-alcohol, an olefinically unsaturated aliphatic hydrocarbon, such as ethene, propene, n-but-1-ene, n-but-2-ene or in particular isobutene or mixtures of such monomers, may also advantageously be used.

The number average molecular weight of the binders II, such as polyisobutene, composed essentially of an olefinically unsaturated hydrocarbon, in particular isobutene, should preferably be from 500,000 to 2 million, in particular from 1 million to 1.6 million.

Particularly suitable α,β-unsaturated carboxylic acids are those of the formula V

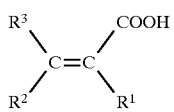

where $R^1$, $R^2$ and $R^3$ are each hydrogen or $C_1$–$C_4$-alkyl, acrylic acid and methacrylic acid being preferred. Mixtures of such carboxylic acids may also be used.

Suitable alcohol components of the esters in addition to the $C_9$–$C_{15}$-alkanols, such as nonanol, decanol, undecanol and dodecanol, are preferably the $C_1$–$C_8$-alkanols, in particular n-propanol, isopropanol, n-butanol, isobutanol, n-hexanol and ethylhexanol, alkoxyalcohols, such as ethoxyethanol, and mixtures of such alcohols.

The stated esters may be used alone or with other monomers by means of which the mechanical, thermal and chemical properties of the polymers composed only of the stated esters are modified but not substantially changed. The comonomers may advantageously be used in amounts of from 0.1 to 40, in particular from 0.1 to 25, mol %.

Such comonomers are preferably the free acids V, acrylic acid and methacrylic acid being preferred, polybasic α,β-unsaturated carboxylic acids, such as maleic acid or fumaric acid, anhydrides of such polyhydric α,β-unsaturated carboxylic acids, such as maleic anhydride and itaconic anhydride, and mono- and diesters of these polybasic carboxylic acids, in particular with $C_1$–$C_{15}$-a1-kanols, such as mono-n-butyl maleate, monohexyl maleate, mono-ethylhexyl maleate, dibutyl maleate, dihexyl maleate, diethylhexyl maleate, mono-n-butyl fumarate, monohexyl fumarate, mono-ethylhexyl fumarate, dibutyl fumarate, dihexyl fumarate or diethylhexyl fumarate, or with polyhydric alcohols, such as ethanediol, propane-1,2-diol, propane-1,3-diol, and the butanediols or glycerol.

Other suitable comonomers are olefinically unsaturated aromatic hydrocarbons, such as styrene and α-methylstyrene, unsaturated nitriles, such as acrylonitrile and methacrylonitrile, halogenated olefins, such as vinyl chloride, vinyl alcohol derivatives, such as vinyl acetate, and mixtures of such monomers. It is also possible to use monomers by means of which the further functional groups, such as acid groups, in particular sulfonic acid and phosphonic acid groups, or silane groups, in particular trichlorosilane, trimethoxysilane and triethoxysilane groups, are introduced into the binder.

Bifunctional monomers which result in easy crosslinking of the polymers II, for example butadiene, divinylbenzene and the polyesters of α,β-unsaturated carboxylic acids with the abovementioned polyhydric alcohols, are also suitable, in small amounts.

The polymers may be prepared by all known polymerization methods, for example by mass polymerization, emulsion polymerization and solution polymerization, with or without the addition of initiators, regulators or catalysts.

Suitable initiators are hydroperoxides, such as cumyl hydroperoxide and tert-butyl hydroperoxide, dialkyl peroxides, such as dicumyl peroxide and di-tert-butyl peroxide, peresters, such as tert-butyl perpivalate and tert-butyl per-2-ethylhexanoate, and azo compounds, such as 2,2'-azobisisobutyronitrile and 2,2'-azobis(methylisobutyrate), and, particularly for the polymerization of isobutene, boron trifluoride and alkylaluminum halides.

Suitable regulators are mercaptans, such as mercaptoethanol, mercaptododecane and mercaptosuccinic acid.

Mixtures of different initiators and/or regulators may also be used.

Initiators and regulators are used in conventional amounts, as a rule in an amount of from 0.1 to 10% by weight, based on the monomer or monomer mixture used.

Suitable solvents or diluents are esters, such as ethyl acetate, hydrocarbons, such as toluene, gasoline and cyclohexane, and in particular cyclic ethers such as tetrahydrofuran and dioxane.

The polymerization is carried out as a rule at from 30° to 150° C., preferably from 60° to 90° C. The polymerization of isobutene can advantageously be carried out at from −40° to −100° C.

When a solvent or diluent is used, the polymers can be isolated from the reaction mixture by known methods, for example by extraction or precipitation, or may preferably be used without isolation for further processing.

The polymers which are particularly suitable as binders II and contain carbamate groups are obtainable by a step reaction, for example in polyurethanes by reacting a polyfunctional isocyanate with a polyhydric alcohol.

Particularly suitable isocyanates are diisocyanates of 6 to 30 carbon atoms. Aliphatic acyclic diisocyanates, such as hexamethylene 1,5-diisocyanate and hexamethylene 1,6-diisocyanate, aliphatic cyclic diisocyanates, such as cyclohexylene 1,4-diisocyanate, dicyclohexylmethane diisocyanate and isophorone diisocyanate of the formula $$\frac{\text{wt of molecules of } SIS}{\text{wt of molecules of } SIS \text{ plus } SI}$$

or aromatic diisocyanates, such as toluylene 2,4-diisocyanate, toluylene 2,6-diisocyanate, m-tetramethylxylylene diisocyanate, p-tetramethylxylylene diisocyanate, tetrahydronaphthylene 1,5-diisocyanate and diphenylmethane 4,4'-diisocyanate, or mixtures of such compounds may advantageously be used.

Suitable alcohol components are polyhydric aliphatic, aromatic-aliphatic and aromatic-cycloaliphatic alcohols having nonphenolic hydroxyl groups as hydroxyl groups of the polyhydric alcohol which are reactive toward isocyanates, preferably diols and triols, or water and mixtures of such compounds.

Preferably used aliphatic diols may be those of 2 to 20 carbon atoms, such as 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1, 3-propanediol, 2,2-dimethyl-1,4-butanediol, neopentyl hydroxypivalate, diethylene glycol, triethylene glycol and methylenediethanolamine.

Suitable aromatic-aliphatic or aromatic-cycloaliphatic diols are preferably those of 8 to 30 carbon atoms. Suitable aromatic structures are heterocyclic ring systems or, preferably, isocyclic ring systems, such as naphthalene derivatives or in particular benzene derivatives, such as bisphenol A or bisphenol F.

Suitable triols are in particular those of 3 to 20 carbon atoms, such as reaction products of trimethylolpropane with ethylene oxide and/or propylene oxide, or preferably glycerol, trimethylolpropane and triethanolamine.

In addition to containing the carbamate group, polyurethane may contain further functional groups, in particular urea groups (carbamido groups), which can be obtained, for example, by reacting an isocyanate group with an amino group, or ester or ether groups, which can be obtained by reacting an isocyanate group with an OH group of a polyester, for example from adipic acid and cyclohexanedimethylol, or of a polyether.

For the preparation of polyurethanes containing urea groups, isocyanates are advantageously reacted with polyfunctional amines, in particular diamines, preferably of 2 to 15 carbon atoms, such as ethylenediamine, 1,6-hexamethylenediamine, 4,9-dioxadodecane-1,12-diamine, or 4,4'-diaminodiphenylmethane, or aminoalcohols, such as monoethanolamine, monoisopropanolamine or 2-amino-2-methylpentan-2-ol.

The preparation of the polyurethanes can be carried out in a manner known per se, in the presence of a catalyst, preferably of a tertiary amine, such as triethylamine, tributylamine, diazabicyclo[2.2.2]octane, N-methylpyridine or N-methylmorpholine, being advisable. Further suitable catalysts are organometallic compounds, such as dibutyltin dilaurate, and metal salts, such as tin octoate, lead octoate or zinc stearate. The amount of the catalysts is in general from 1 to 1000 ppm by weight, based on the total amount of all components of the polyurethanes.

The presence of a solvent or diluent is not essential but is preferred.

Suitable solvents or diluents are hydrocarbons, in particular toluene, xylene or cyclohexane, esters, in particular ethylglycol acetate, ethyl acetate or butyl acetate, amides, in particular dimethylformamide or N-methylpyrrolidone, sulfoxides, in particular dimethyl sulfoxide, ketones, in particular methyl ethyl ketone or cyclohexanone, ethers, in particular diisopropyl ether or methyl tert-butyl ether, and preferably cyclic ethers, in particular tetrahydrofuran or dioxane. Water is also suitable in some cases.

The solvents or diluents may be used individually or as a mixture.

The reaction is carried out as a rule at from 10° to 70° C., resulting in reaction times of from 0.2 to 8 hours.

When a solvent or diluent is used, the polymeric binders II can be isolated from the reaction mixture by known methods, for example by extraction or precipitation, or can preferably be used without isolation for further processing.

The polymeric binders may be used alone or as mixtures. Particularly advantageous mixtures are those which contain polyethers in amounts of from 0.1 to 50, preferably from 20 to 40% by weight, based on the total amount of binder II, in particular as a mixture with polymers II which consist essentially of at least one olefinically unsaturated hydrocarbon, such as ethene, propene, n-but-1-ene, n-but-2-ene or preferably isobutene, or at least one ester of an $\alpha,\beta$-unsaturated carboxylic acid, in particular of a carboxylic acid of the formula V, and a $C_1$–$C_{15}$-alcohol, or mixtures of such compounds.

Suitable electrochemically reactive chemicals III which can reversibly take up or release lithium ions are the substances usually used for electrode materials in electrochemical cells.

These are in particular those compounds III which intercalate lithium ions while simultaneously taking up electrons, or release lithium ions while simultaneously releasing electrons. In the case of rechargeable batteries, these processes should be very substantially reversible. In order to generate an electrical potential between the two electrodes, which is required for the storage of electrical energy, this lithium incorporation or lithium release in the two electrode materials must take place at different electrochemical potentials.

Suitable anode materials are those compounds III which incorporate lithium ions while taking up electrons at a high electrochemical potential, for example carbon in a very wide range of forms, such as natural and synthetic graphites, cokes and carbon blacks or mixtures of such carbon atoms. The carbon may be modified by various measures, for example oxidation or sulfonation.

Such carbons are known, for example, from Ullmann's Encyclopedia of Industrial Chemistry, 5th Ed., Vol. A5, VCH Verlagsgesellschaft mbH, Weinheim, 1986, pages 95–163.

Suitable compounds III which are capable of releasing lithium ions at a low electrochemical potential and are usually used in the cathode material, for example opposite carbon, are salts or salt-like compounds such as chlorides and sulfides and in particular oxides of metals which permit a reversible change of valency without substantial irreversible destruction of the salt structure or salt-like structure with very substantially reversible incorporation or release of the lithium ions, for example Ti, Mn, Co, Ni, Mo or Fe, or mixtures of such compounds.

Compounds of this type may occur in various crystal structures, such as layer structures or in particular spinel structures.

Mixed oxides containing Mn, Co or Ni are particularly suitable. The mixed oxides may additionally contain lithium or, for modification of performance characteristics, further metal atoms.

The preparation of the mixed oxides can be carried out in a manner known per se by solid-state or liquid-phase reaction from suitable intermediates, in particular from salts containing the corresponding metals, and, by means of a few simple preliminary experiments, it is possible to optimize properties such as specific surface area, which is from 0.1 to 30, preferably from 0.1 to 20, in particular from 0.1 to 10, $m^2/g$, measured according to DIN 66132, the specific energy density, which is from 50 to 200, preferably from 100 to 200, mAh/g, or the charge/discharge cycle.

The compounds III can be easily incorporated into the binders II.

For this purpose, at least one compound III can be mixed in a manner known per se with at least one binder II, or at least one compound which can be converted into a binder II and, if required, additives, such as fillers, dispersants or crosslinking agents, in the absence of a diluent or, preferably, in the presence of a liquid diluent, and then applied to a substrate. The further processing can be carried out in a conventional manner, for example by removal of the diluent and, if the binder is crosslinkable, curing of the binder, with subsequent calendering.

The weight ratios of compound III to the binder II should be from 80:20 to 99:1, preferably from 90:1 to 99:1, in particular from 93:7 to 98:2.

Suitable organic diluents are aliphatic ethers, in particular tetrahydrofuran and dioxane, hydrocarbons, in particular hydrocarbon mixtures, such as gasoline, toluene and xylene, aliphatic esters, in particular ethyl acetate and butyl acetate, and ketones, in particular acetone, ethyl methyl ketone and cyclohexanone. In some cases, water is also suitable, provided that it can be completely removed after coating of the substrate. Mixtures of such diluents may also be used.

Fillers used are known to be inorganic and organic pigments, such as silica, titanium dioxide and carbon, such as carbon black and graphite.

Suitable dispersants are aromatics having polyalkylene side chains, such as polyethylene side chains, in particular naphthol etherified with from 10 to 30 ethylene oxide units, and nonionic surfactants, in particular fatty alcohols etherified with polyalkylene oxides, in particular with polyethylene oxide, preferably with from 5 to 30 ethylene oxide units.

Suitable crosslinking agents, in particular substances which crosslink at elevated temperatures, are blocked diisocyanates, etherified urea/formaldehyde resins and in particular melamine/formaldehyde resins etherified, for example, with butanol. Such crosslinking agents may advantageously be used in amounts of from 0.5 to 8, preferably from 1 to 4, % by weight, based on the binder II.

The carriers used may be the conventional rigid or flexible, in particular electrically conductive, carriers, in particular copper and aluminum foils, which are in general from 1 to 50 μm, in particular from 10 to 20 μm, thick.

The layer thickness of the electrode material on the substrate should advantageously be from 50 to 500 μm, in particular from 100 to 300 μm.

In the production of the electrodes, a plurality of layers, at least one of which contains a novel electrode material I, can be applied to the substrate.

Novel electrode materials I and electrodes produced therewith may be used in a manner known per se in electrochemical cells.

Suitable electrolytes are the conventional organic compounds, preferably esters, such as ethylene carbonate, propylene carbonate, dimethyl carbonate and diethyl carbonate, or mixtures of such compounds.

The electrolyte may advantageously contain a conductive salt containing in particular lithium ions, such as $LiPF_6$, $LiAsF_6$, $LiSbF_6$, $LiClO_4$, $LiN(CF_3SO_2)_2$, $LiBF_4$ or $LiCF_3SO_3$.

Such electrochemical cells generally give a voltage of from 3.0 to 4.5 V.

EXAMPLES

Example 1

90 g of graphite (MCMB, from Osaka Gas) were added to a solution of 1.84 g of polyacrylate resin (copolymer of 95% by weight of 2-ethylhexyl acrylate, 3% by weight of acrylic acid, 2% by weight of monobutyl maleate), which contained 2.5% by weight of crosslinking agent (Luwipal 12, from BASF Aktiengesellschaft), in 75.13 g of tetrahydrofuran (THF) while stirring, the stirring was carried out for 10 minutes and the dispersion was then thoroughly mixed on a roller stand for a further 2 hours.

The dispersion was applied to a copper foil by means of a knife coater. The layer was dried for 10 minutes at room temperature and for a further 10 minutes at 100° C.

The electrode had excellent mechanical properties and, in a half-cell test against a lithium metal foil, excellent electrochemical properties.

Example 2

2.3 g of polyethylene oxide having a molecular weight of 2,000,000 (Polyox WSRN 60K, from UCC), 110 g of graphite (MCMB, from Osaka Gas) and 3.75 g of polyacrylate resin (copolymer of 95% by weight of 2-ethylhexyl acrylate, 3% by weight of acrylic acid, 2% by weight of monobutyl maleate), which contained 2.5% by weight of a crosslinking agent (Luwipal 12, from BASF Aktiengesellschaft), were added to a mixture of 245 g of THF and 118 g of dioxane while stirring at 40° C. and were mixed for 24 hours at from 30° to 35° C. on the roller stand.

The dispersion was applied to a copper foil by means of a knife coater. The layer was dried for 10 minutes at room temperature and for a further 60 minutes at 120° C.

The electrode had excellent mechanical properties and, in a half-cell test against a lithium metal foil, excellent electrochemical properties.

Example 3

4.8 g of SAB carbon black (from Chevron Chemical Company) and 91.20 g of $LiCoO_2$ pigment were added, with thorough stirring, to a solution of 4 g of polyacrylate resin (copolymer of 95% by weight of 2-ethylhexyl acrylate, 3% by weight of acrylic acid, 2% by weight of monobutyl maleate), which contained 2.5% by weight of a crosslinking agent (Luwipal 12, from BASF Aktiengesellschaft), in 122.23 g of tetrahydrofuran (THF), thorough stirring was carried out for 5 minutes and the dispersion was then thoroughly mixed for a further 2 hours on a roller stand.

The dispersion was applied to an aluminum foil by means of a knife coater. The layer was dried for 10 minutes at room temperature and for a further 10 minutes at 100° C.

The electrode had excellent mechanical properties and, in a half-cell test against a lithium metal foil, excellent electrochemical properties.

Example 4

A mixture of 194 g of graphite (MCMB, from Osaka Gas), 6 g of polyisobutene (having a limiting viscosity number of from 551 to 661 $g/cm^3$) and 225.53 g of THF was dispersed with 100 g of steel balls (diameter 4–6 mm) for 20 hours. After the steel balls are separated off, the dispersion was applied to a copper foil by means of a coating apparatus at a speed of 1.3 m/min and dried at 57° C.

The electrode had excellent mechanical properties and, in a half-cell test against a lithium metal foil, excellent electrochemical properties.

Example 5

A mixture of 92.15 g of $LiCoO_2$ pigment, 4.85 g of SAB carbon black (from Chevron Chemical Company), 3 g of polyisobutene (having a limiting viscosity number of from 551 to 661 $g/cm^3$) and 132.56 g of THF was dispersed with 350 g of steel balls (diameter 4–6 mm) for 42 hours.

After the steel balls had been separated off, the dispersion was applied to an aluminum foil by means of a knife coater. The layer was dried for 10 minutes at room temperature and for a further 10 minutes at 100° C.

The electrode had excellent mechanical properties and, in a half-cell test against a lithium metal foil, excellent electrochemical properties.

Example 6

A mixture of 9095.63 g of graphite (KS6, from Lonza G&T), 1892.92 g of a polyurethane resin (Mortane CA 330, from Morton Thiocol), 224.44 g of a β-naphthol etherified with 11 ethylene oxide units, 12591.17 g of THF and 4936.42 g of dioxane was dispersed for 24 hours.

The dispersion was applied to an aluminum foil by means of a knife coater. The layer was dried for 10 minutes at 120° C.

The electrode had excellent mechanical properties and, in a half-cell test against a lithium metal foil, excellent electrochemical properties.

Example 7

A mixture of 1271.60 g of graphite (MCMB, from Osaka Gas), 39.78 g of SAB carbon black (from Chevron Chemical Company), 415.32 g of a polyurethane resin (Mortane CA 330, from Morton Thiocol), 65.12 g of a methyl-blocked β-naphthol etherified with 11 ethylene oxide units, 646.95 g of THF and 189.61 of dioxane was first dispersed for 6 hours with 3883.33 g of steel balls (diameter 4–6 mm) and then dispersed for a further 18 hours after removal of the steel balls.

The dispersion was applied to an aluminum foil by means of a knife coater. The layer was dried for 10 minutes at 120° C.

The electrode had excellent mechanical properties and, in a half-cell test against a lithium metal foil, excellent electrochemical properties.

Example 8

A mixture of 639.22 g of $LiCoO_2$ pigment, 41.47 g of graphite (KS10, from Lonza G&T), 23.74 g of carbon black (Ensaco 150 E GRAN, from M.M.M. Ensari Carbon Black), 140.72 g of a polyurethane resin (Mortane CA 330, from Morton Thiocol), 22.71 g of a methyl-blocked β-naphthol etherified with 11 ethylene oxide units, 182.48 g of THF and 48.76 g of dioxane was dispersed for 2 hours with 566.4 g of ceramic balls (Zr/Si oxide ceramic, diameter 1–1.25 mm).

After removal of the ceramic balls, the dispersion was applied to an aluminum foil by means of a knife coater. The layer was dried for 10 minutes at 120° C.

The electrode had excellent mechanical properties and, in a half-cell test against a lithium metal foil, excellent electrochemical properties.

We claim:

1. A secondary lithium-ion electrochemical cell containing an electrode material I comprising
    a) a polymeric binder II which is composed essentially of polyisobutene having a limiting viscosity number of from 551 to 661 $g/cm^3$ and
    b) a solid III which is capable of reversibly taking up or releasing lithium ions in an electrochemical reaction.

2. The cell as defined in claim 1, containing carbon as compound III.

3. The cell as defined in claim 1, containing, as compound III, a mixed oxide containing Mn, Co, Ni, Fe or Mo ions and lithium ions.

4. The cell as defined in claim 1, containing a polyether IV.

5. The cell as defined in claim 1 comprising an electrode containing the electrode material I.

* * * * *